Aug. 18, 1931.    E. J. MARTEL    1,818,997
AUTOMOBILE LOCKING MECHANISM
Filed April 10, 1930
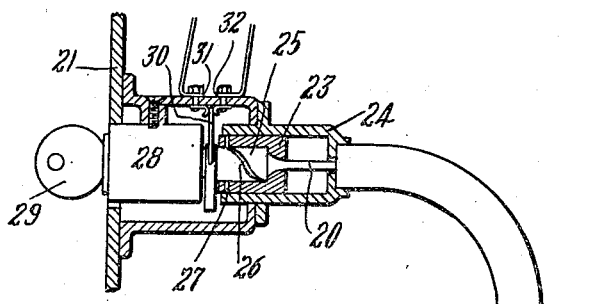
Fig. 1
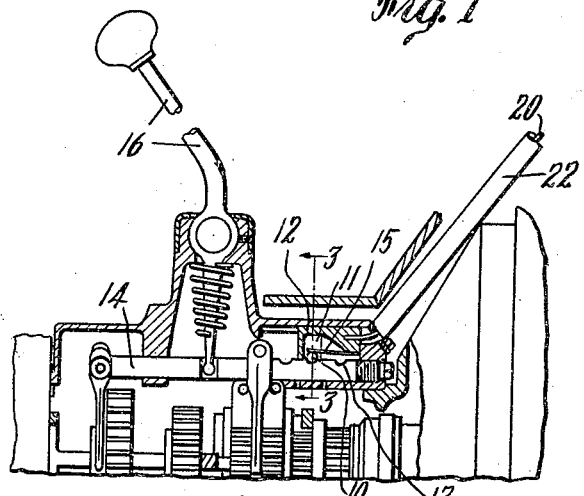
Fig. 2
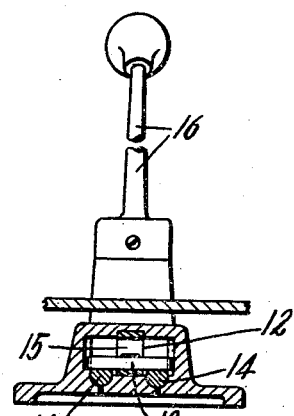
Fig. 3
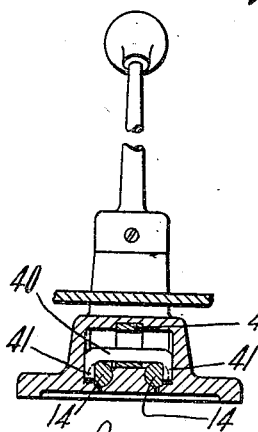
Fig. 6
Fig. 5
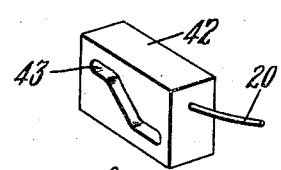
Fig. 7
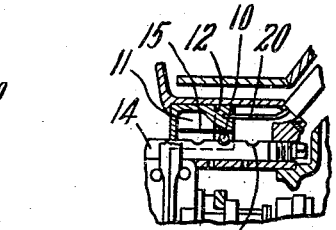
Fig. 4
Inventor:
Edgar J. Martel.
by Wright, Brown, Quinby & May
Attys.

Patented Aug. 18, 1931

1,818,997

UNITED STATES PATENT OFFICE

EDGAR J. MARTEL, OF LACONIA, NEW HAMPSHIRE

AUTOMOBILE LOCKING MECHANISM

Application filed April 10, 1930. Serial No. 443,091.

This invention relates to mechanism for locking the transmission gear of an automobile in any of its positions of operation including neutral, any speed ahead, and reverse. The usual transmission mechanism employed in most automobiles includes a pair of shifter rods by which the connecting gears are selectively moved into and out of mesh to effect the desired connections for driving. In order to retain the shifter rods releasably in any position of operation or in neutral position, a spring-pressed detent is frequently provided to engage in shallow depressions in the rods when the rods are moved to any position of operation.

According to the present invention locking mechanism is provided including a member movable into depressions in the sides of the rods when the rods are in any position of operation and means for rigidly holding said member in the depressions to prevent movement of the shifter rods when it is desired that the transmission be locked. The member entering the depressions in the rods may also be spring-pressed so that it not only acts as a lock on some occasions, but also acts as a yielding detent for holding the shifter rods releasably in place during the operation of the car. The means by which the detent is rigidly fixed in the depressions of the shifter rods may be operated through a flexible cable from a lock on the dashboard of a vehicle or from any other advantageous point. In combination with the transmission lock I may also provide an ignition lock by which the ignition circuit is automatically opened whenever the transmission locking mechanism is moved to operative position.

For a more complete understanding of the invention reference may be had to the description thereof which follows and to the drawings, of which,—

Figure 1 is a sectional view of a lock-operating mechanism which may be mounted on the dashboard of a vehicle.

Figure 2 is a sectional view of a transmission mechanism showing a combination detent and lock for the shifter rods.

Figure 3 is a section on the line 3—3 of Figure 2.

Figure 4 is a fragmentary portion of Figure 2 showing the parts in a different position of operation.

Figure 5 is a perspective view of a sliding block shown in Figure 2.

Figure 6 is a transverse section similar to Figure 3, but showing a modified form of construction.

Figure 7 is a perspective view of a sliding block shown in Figure 6.

Referring to the drawings in detail, an embodiment of the invention is illustrated in Figure 2 and includes a short rod 10 extending through a hollow 11 in a block 12 and adapted to enter shallow depressions 13 in the upper sides of a pair of shifter rods 14 which are a part of the transmission mechanism. The rod 10 may be restricted to vertical movement by vertical grooves in the gear housing, and may be resiliently pressed downwardly as by a suitable leaf spring 15 carried within the block 12. The shifter rods may be selectively operated in the usual manner by a suitable gear shift lever 16. When the parts are in the position illustrated in Figure 2, the rod 10 is free to rise against the spring 15 when either of the shifter rods 14 is pushed by manipulation of the gear shift lever 16, the rod 10 easily riding out of the shallow depressions 13. Thus the rod 10 acts as a yielding detent to hold the shifter rods 14 in any position of operation during the ordinary operation of the vehicle. If, however, the block 12 be moved toward the left, as shown in Figure 2, the rod 10 enters the narrowed portion 17 of the block wherein it is held rigidly against upward movement out of the depressions 13 in which it then is. This locking position of the block 12 is illustrated in Figure 4. Any suitable mechanism may be provided for moving the block 12 toward the left for locking action and toward the right to release the rod 10 and thus to unlock the transmision.

As shown, a flexible cable 20 is attached to the face of the block, this cable being carried to any convenient point of the car, such, for example, as the dashboard 21, and being suitably protected by an armored casing 22. For the actuation of the cable 20, a cam mechanism may be provided comprising a sliding block 23 fitted in a housing 24. The cable 20 is suitably anchored to the sliding block 23, the latter being prevented from rotation in the housing 24 by a non-cylindrical form or a spline connection therewith. The sliding block 23 is provided with a cylindrical bore which extends part way therethrough. Fitted within this bore is a rotatable cam member 25 having a pair of helical cam slots 26 cut in the cylindrical face thereof. A pair of pins 27 are mounted in the block 23 and extend inwardly into the cam slots 26 so that when the cam member 25 is rotated, the pins 27 impart axial movement to the sliding block 23 and thus exert a push or pull on the cable 20 according to the direction of rotation of the cam member 25. The cam member may be operatively connected to a suitable barrel lock 28, the lock being of any desired type, such as a combination lock or a key-operated lock, a suitable key 29 being provided for the latter type.

Connected with the cam member 25 may be a knife switch 30 adapted to close a gap between two contact points 31, 32 which may be connected in the ignition circuit or in any other operating circuit of the car. The knife switch 30 is mounted with relation to the contact points in such a way that when the locking block 12 is in its inoperative position, the ignition circuit is closed. When, however, the key 29 is turned so as to move the block 12 to its locking position, the knife switch 30 is moved out of contact with the points 31, 32 so that the ignition circuit is thereupon opened.

A modified form of the invention is illustrated in Figures 6 and 7 in which is shown a locking member 40 having two downwardly extending portions 41 adapted to enter lateral depressions in the sides of the shifter rods 14. The position of the locking member 40 may be controlled by a block 42. This block, as shown in Figure 7, may have a cam slot 43 therein adapted to raise and lower the locking member 40. The block itself may be moved as by a cable 20, or any other convenient means, so as to raise the locking member 40 to inoperative position or to lower it to locking position in which it is rigidly held by the cam slot 43.

I claim:

1. In an automobile transmission mechanism including a pair of shifter rods having depressions therein, a loose transverse rod adapted to rest in any depression in each rod, means for holding said transverse rod yieldingly or rigidly in said depressions, said holding means comprising a block having a hollow portion through which the loose rod extends, a spring in said hollow portion adapted to rest yieldingly against the loose rod when the block is in one position of operation, said block having a portion rigidly resting on said loose rod when the block is in another position of operation.

2. In an automobile transmission mechanism including a pair of shifter rods, each having a series of notches on its upper face, a transverse member adapted to ride into and out of these notches as the shifter rods are shifted, locking means movable into position to hold said transverse member positively in said notches and a spring located in a position to rest yieldingly against the transverse member when the locking means is moved to inoperative position so as to hold the transverse member yieldingly in said notches.

3. In an automobile transmission mechanism having notched shifter rods, a locking mechanism comprising an element adapted to enter notches in said shifter rods, and means movable to retain positively said element in said notches, said retaining means including a block having a laterally extending central opening through which said element extends, said block being movable transversely of the element, the upper limit of said opening being higher at one point than at another.

4. In an automobile transmission mechanism having notched shifter rods, a locking mechanism comprising an element adapted to enter notches in said shifter rods, and means movable to retain positively said element in said notches, said retaining means including a block slidable in a direction parallel to the shifter rods, said block having a face presented downwardly toward said element, said face being shaped to provide clearance above said element when the block is in one position, and to provide substantially no clearance above the element when the block is in another position.

In testimony whereof I have affixed my signature.

EDGAR J. MARTEL.